United States Patent [19]

Stansbury

[11] 3,856,315
[45] Dec. 24, 1974

[54] BELL AND SPIGOT PVC PIPE JOINT
[76] Inventor: Patrick H. Stansbury, N. 800 Fancher Way, Terminal Box 2706, Spokane, Wash. 99220
[22] Filed: Jan. 2, 1973
[21] Appl. No.: 320,282

[52] U.S. Cl............. 277/188, 277/205, 277/DIG. 2
[51] Int. Cl.............................................. F16j 15/10
[58] Field of Search ....... 277/207, 207 A, 205, 188, 277/189; 285/230, 231, 345

[56] References Cited
UNITED STATES PATENTS
| | | | |
|---|---|---|---|
| 2,144,682 | 1/1939 | MacClatchie | 277/205 |
| 2,991,092 | 4/1961 | MacKay | 277/207 A |
| 3,071,386 | 1/1963 | Scannell | 277/188 |
| 3,260,540 | 7/1966 | Hovot | 277/207 A |
| 3,265,410 | 8/1966 | Lorang | 277/207 A |
| 3,271,038 | 9/1966 | Bastow | 277/205 |

Primary Examiner—Harry N. Haroian
Assistant Examiner—Robert I. Smith

[57] ABSTRACT

A bell and spigot PVC pipe joint having formed in the bell an annular recess with a profile complementary to the unique shape of a new dual material annular gasket. The joint is adaptable for use between two sections of pipe in a generally straight pipeline and/or between a section of pipe, fittings, valves, and the like.

20 Claims, 9 Drawing Figures

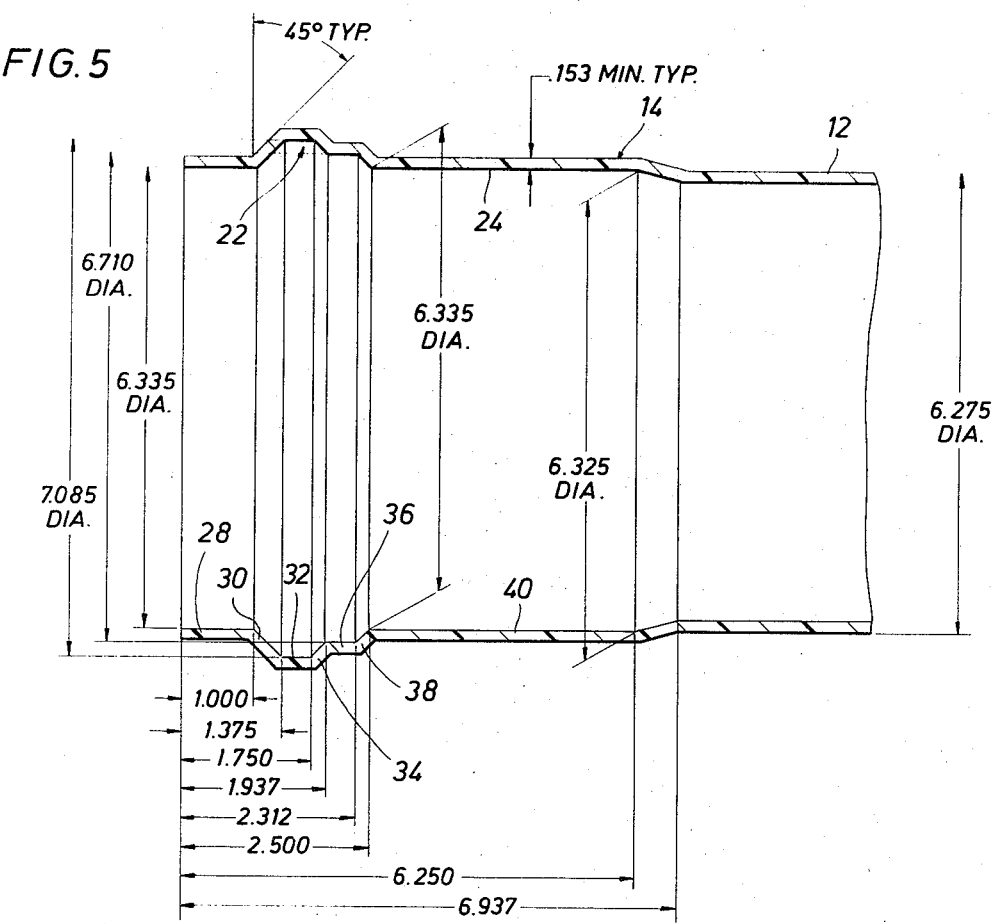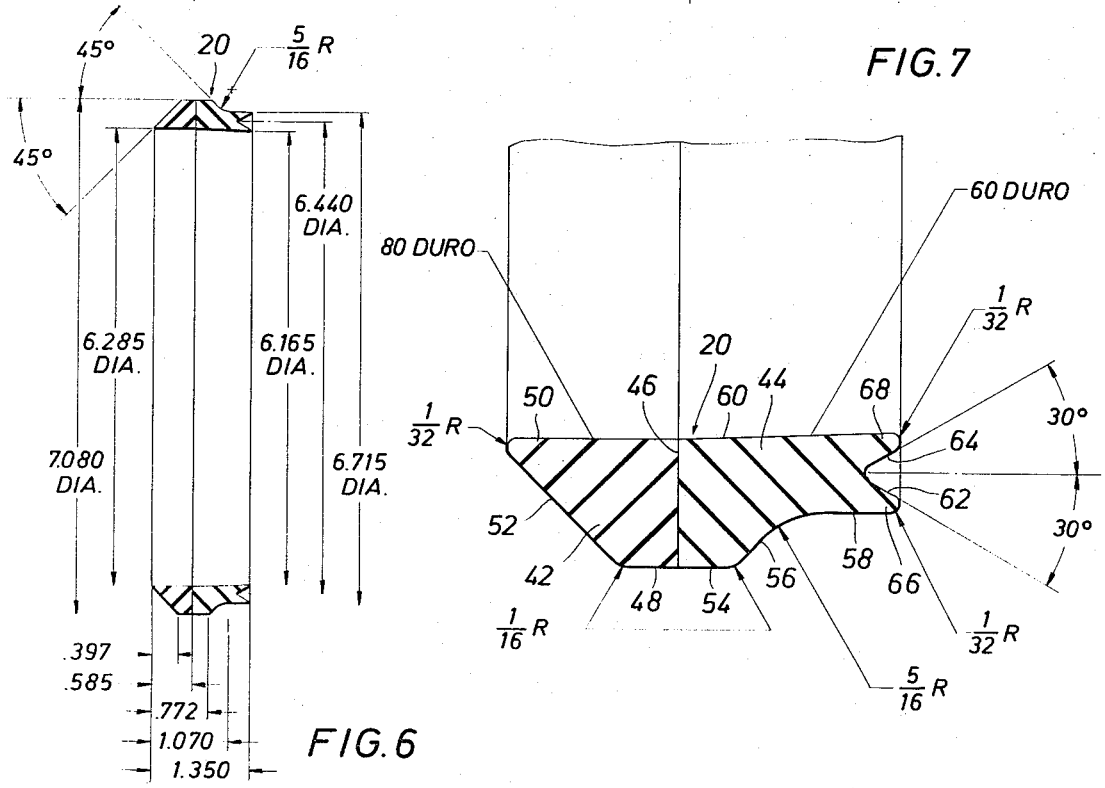

BELL AND SPIGOT PVC PIPE JOINT

BACKGROUND OF THE INVENTION

This invention relates generally to pipe joints, and more particularly to polyvinyl chloride (PVC) pipe joints of the bell and spigot type for use between two sections of PVC pipe and/or in connection with PVC pipe fittings, valves, and the like.

Countless United States patents demonstrate that bell and spigot pipe joints have been well known for at least decades and that throughout that period skilled artisans have been attempting to make more satisfactory bell and spigot pipe joints. See, for example, the following U.S. Pat.: No. 1,856,580 issued to Mitchell on May 3, 1932; No. 2,116,705 issued to Marx et al. on May 10, 1938; No. 2,230,725 issued to Nathan on Feb. 4, 1941; No. 2,272,811 issued to Nathan on Feb. 10, 1942; No. 2,323,482 issued to Merrill on July 6, 1943; No. 2,953,398 issued to Haugen et al. on September 20, 1960; No. 2,966,539 issued to Sears et al. on Dec. 27, 1960; No. 2,991,092 issued to MacKay on July 4, 1961; No. 3,020,054 issued to Driancourt on Feb. 6, 1962; and No. 3,315,971 issued to Sakurada on Apr. 25, 1967. Thus, it is apparent that workers in the art have been and still are seeking to solve the problems inherent in bell and spigot pipe joints by designing newly shaped bells, spigots, annular gaskets, and/or annular recesses for receiving those gaskets, as well as by making those gaskets of new materials or combinations thereof. However, the great majority of that past effort has been directed toward bell and spigot joints for steel and/or cast iron pipe.

In recent years, the shortcomings of existing bell and spigot pipe joints have become even more acute with respect to PVC pipe due to its unusual properties (e.g., PVC is a thermoplastic). Also, there are certain limitations in the fabrication of an integral PVC bell that render many steel and/or cast iron bell and spigot pipe joints unsuitable for use as PVC bell and spigot pipe joints. Consequently, in view of the rapidly increasing popularity of PVC pipe, there has been a need for a more effective bell and spigot PVC pipe joint.

SUMMARY OF THE INVENTION

Briefly, the present invention contemplates a bell and spigot PVC pipe joint with an annular gasket having a unique cross-section and made of two resilient materials of different hardness providing not only a good compressive seal but also resistance to cold extrusion and fishmouthing. The gasket is seated in an annular recess shaped to snugly receive the gasket.

BRIEF DESCRIPTION OF THE DRAWINGS

A more complete appreciation of the invention and many of the attendant advantages thereof will be readily appreciated as the same becomes better understood by reference to the following detailed description when considered in connection with the accompanying drawings wherein:

FIG. 5 is a detailed elevation view in section of the bell end of a section of PVC pipe for use in a 6 inch PVC pipe joint according to a second preferred embodiment of the present invention;

FIG. 6 is a detailed elevation view in section of an annular sealing gasket for use in a 6 inch PVC pipe joint according to the second preferred embodiment of the present invention;

FIG. 7 is an enlarged detail elevation view in section of a portion of the annular sealing gasket shown in FIG. 6;

DESCRIPTION OF THE PREFERRED EMBODIMENT

Figure 1:
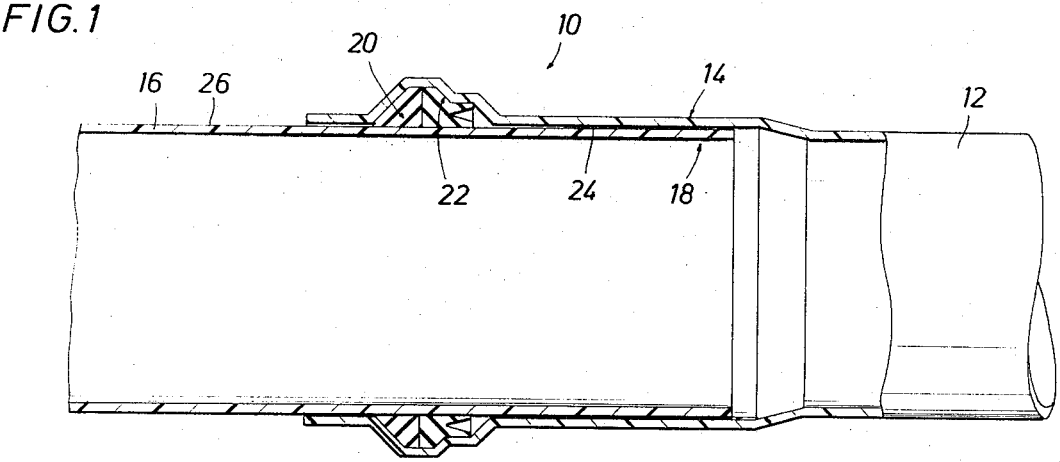
FIG. 1 is an elevation view, partly in section, of a bell and spigot PVC pipe joint according to the present invention.

Referring now to the drawings wherein like reference characters designate identical or corresponding parts throughout the several views, and more particularly to FIG. 1 thereof wherein the bell and spigot PVC pipe joint of the present invention, indicated generally by reference numeral 10, is shown as consisting essentially of a section of PVC pipe 12 having a bell end 14, another section of PVC pipe 16 having a spigot end 18, and an annular sealing gasket 20 positioned in an annular recess or cavity 22 in bell 14 and compressed between an inner surface 24 of bell 14 and an outer surface 26 of spigot 18. The details of the joint may be more easily understood by reference to FIGS. 2–4, 5–7, and 8–9, depicting presently preferred embodiments of the invention for 4 inch and 6 inch PVC pipe, respectively. However, it should be understood that the present invention is applicable to PVC pipe and PVC pipe fittings, valves, and the like of various other sizes.

Figure 2:
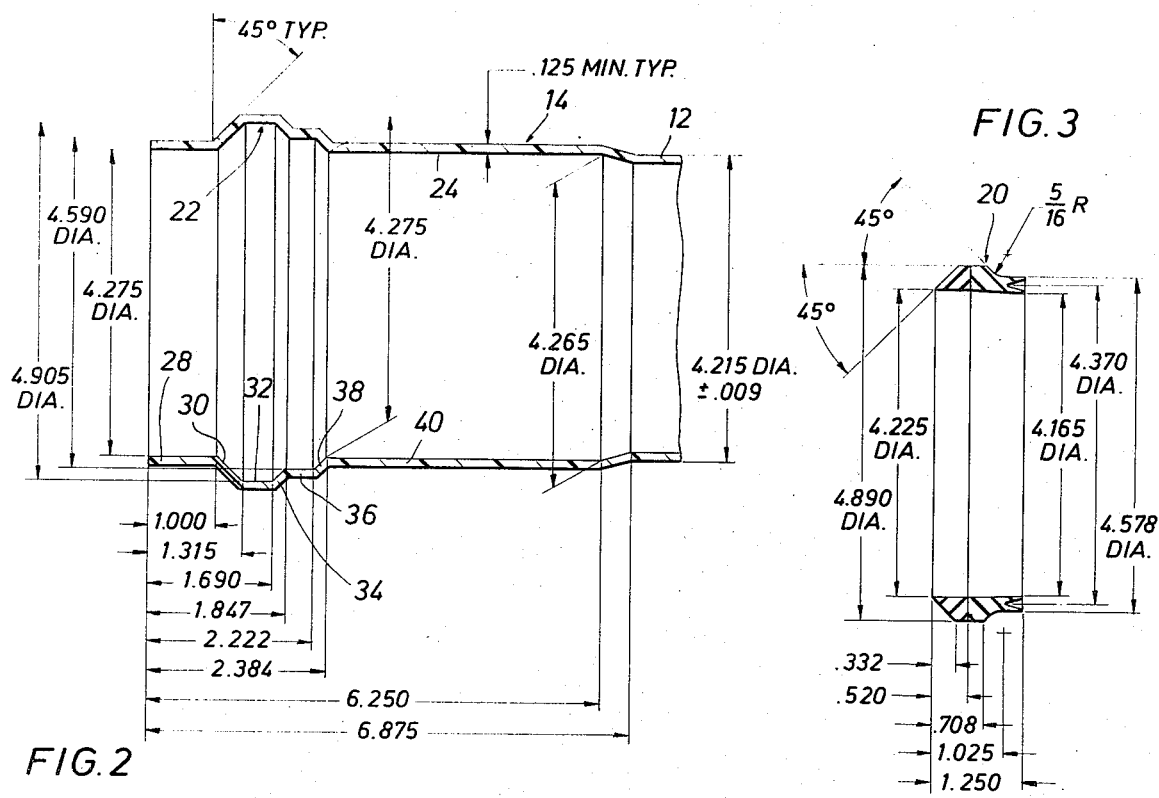
FIG. 2 is a detailed elevation view in section of the bell end of a section of PVC pipe for use in a 4 inch PVC pipe joint according to a first preferred embodiment of the present invention.
Figure 3:
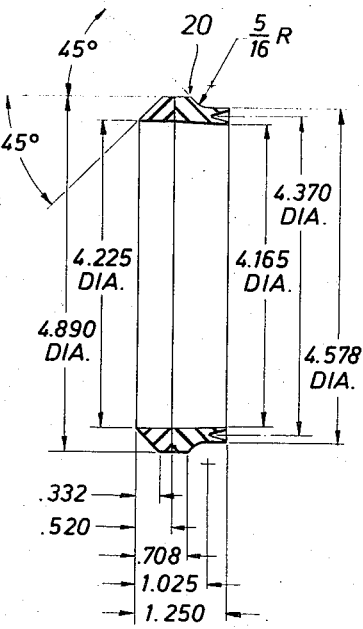
FIG. 3 is a detailed elevation view in section of an annular sealing gasket for use in a 4 inch PVC pipe joint according to the first preferred embodiment of the present invention.

Referring now to FIGS. 2 and 5, the profile of bell 14 will be examined in detail. The front portion 28 of bell 14 has a cylindrical inner surface with an inside diameter slightly larger, on the order of 0.0030 inch to 0.0050 inch, than the outside diameter of the spigot. Front portion 28 should have an axial length sufficient to eliminate or minimize misalignment when the spigot is inserted in the bell; and, according to the presently preferred embodiments, the axial length of front portion 28 should be at least 10 percent of the outside diameter of the spigot.

Front portion 28 is intersected by a first sharply flared portion 30 having a conical inner surface. According to the presently preferred embodiments, the conical inner surface of flared portion 30 is disposed at an angle of at least 45 percent with respect to the centerline or axis of the bell in order for the gasket to resist cold extrusion under long term use.

Flared portion 30 is intersected by deep recessed portion 32 having a cylindrical inner surface recessed as deeply as possible without degrading the mechanical properties of the wall of the bell in order to provide the most secure seat possible for gasket 20.

Deep recessed portion 32 is intersected by a second sharply flared portion 34 having a conical inner surface. According to the presently preferred embodiments, the conical surface of second flared portion 34 is disposed at an angle of at least 45 percent with respect to the centerline or axis of the bell in order for the gasket to resist fishmouthing during assembly of the joint.

Second flared portion 34 is intersected by a recessed portion 36 having a cylindrical inner surface having an inner diameter between the inner diameters of the inner cylindrical surfaces of front portion 28 and deep recessed portion 32. Recessed portion 36 should have an axial length that is great enough to accommodate to complementary portion of gasket 20 to be discussed hereinafter.

Recessed portion 36 is intersected by a third flared portion 38 having a conical inner surface, that may be disposed at any convenient angle, such as 45°, with respect to the centerline or axis of the bell.

Third flared portion 38 is intersected by a major portion 40 having an inner surface which in the drawings appears to be cylindrical but is actually very slightly tapered. The diameter of the inner surface of major portion 40 at the intersection with third flared portion 38 is slightly larger, on the order of 0.0030 inch to 0.0050 inch, than the outer diameter of the spigot. However, the diameter of inner surface of major portion 40 adjacent the convergence of bell 14 into the pipe section 12 is about equal to the outer diameter of spigot.

As is well known in the art, there are in general two ways in which the bells are formed. According to the presently preferred embodiment, the bell has been formed by widening a thickened portion of an extruded PVC pipe section so that the wall of the bell is sufficiently thick and strong to maintain its structural integrity independently of any circumferential sleeve; that is, the structural integrity of the bell may be generally the same as, or perhaps even greater than, that of the remainder of the pipe section. On the other hand, it is equally well known in the art that, when a bell is formed in a uniform extruded PVC pipe section, the stretching of the material at the bell results in a decreased bell wall thickness and strength; and a circumferentially disposed reinforcing sleeve may be necessary to ensure the structural integrity of the pipe joint. In any event, it should be apparent that the present invention may be practiced with or without a reinforcing sleeve.

Referring now to FIGS. 3-4, 6-7, and 8-9, the cross-section of annular gasket 20 will be examined in detail. Gasket 20 comprises a hard portion 42, preferably made of rubber having a Shore A durometer hardness of about 80, and a soft portion 44, preferably made of rubber having a Shore A durometer hardness of about 60, bonded together at planar interface 46 perpendicular to the axis of the gasket.

The cross-section of hard portion 42 is generally trapezoidal since cylindrical surfaces 48 and 50 are generally parallel to one another and perpendicular to planar interface 46. Conical surface 52, as illustrated, intersects cylindrical surfaces 48 and 50 at angles of 135° and 45°, respectively, although it should be understood that those angles may be lesser and greater, respectively. Hard portion 42 sufficiently stiffens the gasket to provide a strong semi-rigid hoop with mechanical and physical properties that resist deformation, fishmouthing, and cold extrusion when inserted in the joint.

Figure 4:
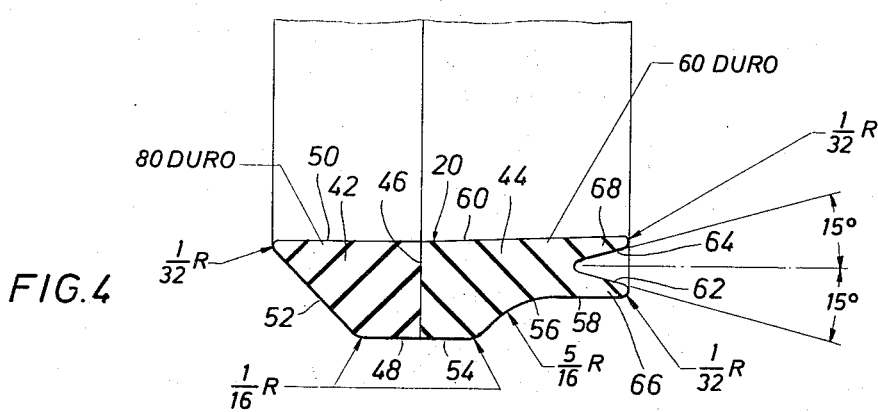
FIG. 4 is an enlarged detail elevation view in section of a portion of the annular sealing gasket shown in FIG. 3.

The cross-section of soft portion 44 is somewhat irregular. A cylindrical surface 54 intersects planar interface 46 at right angles, and cylindrical surfaces 48 and 54 are actually in the same cylindrical surface. Cylindrical surface 54 intersects a concaved curved surface 56 which intersects a cylindrical surface 58. A very slightly tapered cylindrical surface 60 intersects planar interface 46 at an angle of about 100°. Lastly, a pair of mutually intersecting conical surfaces 62 and 64 intersect surfaces 58 and 60, forming a pair of lips 66 and 68. As shown in FIGS. 4 and 7, the angle between mutually intersecting conical surfaces 62 and 64 may vary from about 30° to about 60°.

Soft portion 44 is thus designed to achieve both a compressive seal (between surfaces 54 and 60) and a chevron seal (as lips 66 and 68 are spread apart by the effect of fluid pressure on mutually intersecting conical surfaces 62 and 64).

Figure 8:
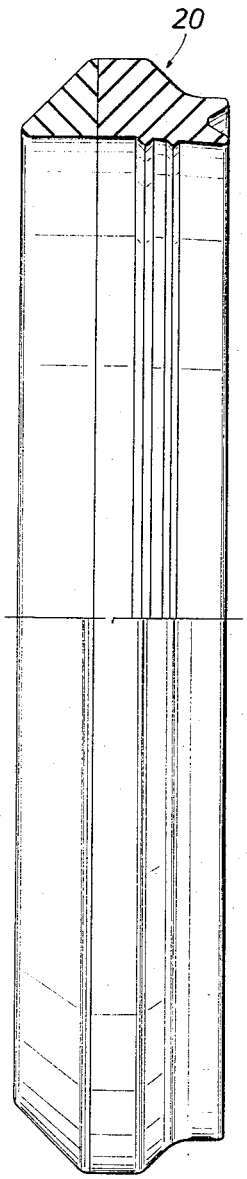
FIG. 8 is a detailed elevation view in section of another annular sealing gasket for use in a 6 inch PVC pipe joint according to the second preferred embodiment of the present invention.
Figure 9:
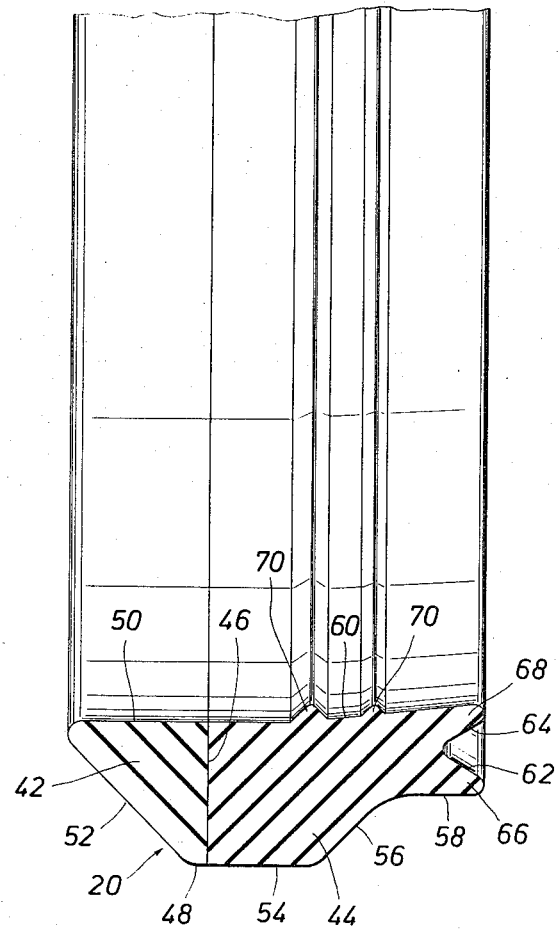
FIG. 9 is an enlarged detail elevation view in section of a portion of the annular sealing gasket shown in FIG. 8.

The embodiment of the annular gasket shown in FIGS. 8-9 differs from that shown in FIGS. 6-7 primarily in that the cross section of the former includes one or more nipples 70 protruding from surface 60. Also, planar interface 46 between the hard and soft portions of the gasket may be move slightly to the left so that there is less of the harder material. It has been found that, during the field assembly of the pipe joint, careless workers sometimes permit the spigot end of the joint to contact the earth before the joint is assembled, whereby dirt and/or other foreign matter may adhere to the spigot before it is inserted into the bell. Accordingly, nipples 70 are provided to wipe the spigot as it passes through the annular gasket so that the dirt will be removed and will not interfere with (a) the proper seating of lip 68 against the spigot and (b) the chevron seal at that point.

Inasmuch as the dimensions of the bell, the annular gasket, and the annular recess are shown in the drawings, those dimensions will not be otherwise discussed in the text of the specification. However, it should be understood that the dimensions are shown as representative of merely the preferred embodiments of the pipe joint of the present invention as applied to 4 inch and 6 inch PVC pipe.

The assembly of the disclosed bell and spigot PVC pipe joint should be apparent to those skilled in the art and, therefore, need not be mentioned herein.

For reasons that are not precisely understood, the bell and spigot PVC pipe joint according to the present invention has produced outstanding results under such tests as: Microscopic Examination, Quick Burst, Hydrostatic, Impact, Vacuum, Low Pressure, Organoleptic Variation and Field Testing.

Obviously, numerous modifications and variations of the present invention are possible in the light of the above teachings. It is therefore to be understood that, within the scope of the appended claims, the invention may be practiced otherwise than as specifically described herein by reference to the preferred embodiments. For example, it should be understood, with respect to the cross section of the annular gasket, that any of the segments stated as being linear might be slightly curved and/or vice versa and that any of the intersections of the segments may either be sharp or slightly rounded. Similarly, the conical and cylindrical surfaces of the annular recess may not be strictly conical or cylindrical, and the intersections stated to be sharp may be slightly rounded.

Also, the bell and spigot PVC pipe joint of the present invention is illustrated in the drawings and otherwise generally discussed in this specification in the context of an integral pipe joint, that is, a joint formed between two sections of pipe wherein one end of one of the pipe sections is formed as the bell or female end of the joint and one end of the other pipe section is formed as the spigot or male end of the joint. Typically, sections of pipe are fabricated by expanding one end to form the bell and using the other standard cylindrical end as the spigot; and a plurality of those pipe sections are used, with sealing gaskets, to form a generally straight pipeline by connecting those pipe sections end to end. However, it should be clearly understood that, in the construction of a pipeline or network of pipelines, it may be necessary or desirable to use (1) L-fittings to construct a right angle turn in a pipeline; (2) T-fittings to interconnect an intermediate point of one pipeline with the end of another, mutually perpendicular, pipeline; (3) or other types of fittings, valves, and/or the like. Accordingly, although the bell and spigot PVC pipe joint of the present invention has been depicted in this specification in the context of a joint between two sections of pipe in a substantially straight pipeline, it should be clearly understood that the bell and spigot PVC pipe joint of the present invention may also be embodied in pipe joints in a fitting, valve, or the like. Thus, use of the terms "section of pipe" in the appended claims means not only an elongate section of generally cylindrical pipe but also the relatively shorter section of generally cylindrical pipe (male or female) formed in fittings, valves or the like so that those fittings, valves, or the like may be connected to one another and/or into a pipeline.

What is claimed as new and deserved to be secured by Letters Patent of the United States is:

1. A pipe joint comprising:
    a spigot at one end of a first section of PVC pipe;
    a bell at one end of a second section of PVC pipe, said bell having a sufficiently large diameter to accommodate said spigot therein and having an annular recess formed therein;
    an annular gasket seated in said annular recess and sealingly compressed between said bell and said spigot;
    said gasket comprising a first portion formed of a first resilient material having a first hardness bonded to a second portion formed of a second resilient material having a second hardness less than said first hardness;
    the cross-section of said first portion comprising a first linear segment, a second linear segment having one end intersecting one end of said first linear segment, a third linear segment longer than said second linear segment and having one end intersecting the other end of said first linear segment, and a fourth linear segment intersecting the other ends of said second and third linear segments;
    the cross-section of said second portion comprising said first linear segment, a fifth linear segment having one end intersecting said one end of said first linear segment, a concave curved segment having one end intersecting the other end of said fifth linear segment, a sixth linear segment having one end intersecting the other end of said curved segment, a seventh linear segment having one end intersecting said other end of said first linear segment, and a V-shaped segment intersecting the other ends of said sixth and seventh linear segments.

2. The pipe joint of claim 1 wherein said first linear segment is perpendicular to the axis of said annular gasket.

3. The pipe joint of claim 2 wherein said second linear segment is parallel to the axis of said annular gasket.

4. The pipe joint of claim 3 wherein said third linear segment is parallel to the axis of said annular gasket.

5. The pipe joint of claim 4 wherein said fourth linear segment intersects said third linear segment at an angle of at least about 45°.

6. The pipe joint of claim 5 wherein said second and fifth linear segments are colinear.

7. The pipe joint of claim 6 wherein said first linear segment and said seventh linear segment intersect one another at an angle of about 100°.

8. The pipe joint of claim 6 wherein said first resilient material is rubber having a Shore A durometer hardness of about 80 and said second resilient material is rubber having a Shore A durometer hardness of about 60.

9. The pipe joint of claim 8 wherein the angle defined by said V-shaped segment is between about 30° and about 60°.

10. The pipe joint of claim 8 wherein at least one nipple protrudes from said seventh linear segment.

11. The pipe joint of claim 1 wherein
    the inner surface of said bell is generally cylindrical; and
    the inner surface of said annular recess formed in said bell comprises:
        a first truncated conical surface coaxial with said bell and having a minor circumference equal to the circumference of said inner surface of said bell;
        a first cylindrical surface coaxial with said bell and having a diameter equal to the major diameter of first truncated conical surface;
        a second truncated conical surface coaxial with said bell and having a major diameter equal to the diameter of said first cylindrical surface;
        a second cylindrical surface coaxial with said bell and having a circumference equal to the minor circumference of said second truncated cone but greater than the circumference of said inner surface of said bell; and
        a third truncated conical surface coaxial with said bell and having a major circumference equal to the circumference of said second cylindrical surface and having a minor circumference equal to the circumference of said inner surface of said bell,
        whereby said inner surface of said bell is intersected by said first truncated conical surface which is intersected by said first cylindrical surface which is intersected by said second conical surface which is intersected by said second cylindrical surface which is intersected by said third truncated conical surface which is intersected by said inner surface of said bell.

12. The pipe joint of claim 11 wherein said first linear segment is perpendicular to the axis of said annular gasket.

13. The pipe joint of claim 12 wherein said second linear segment is parallel to the axis of said annular gasket.

14. The pipe joint of claim 13 wherein said third linear segment is parallel to the axis of said annular gasket.

15. The pipe joint of claim 14 wherein said fourth linear segment intersects said third linear segment at an angle of at least about 45°.

16. The pipe joint of claim 15 wherein said second and fifth linear segments are colinear.

17. The pipe joint of claim 16 wherein said first linear segment and said seventh linear segment intersect one another at an angle of about 100°.

18. The pipe joint of claim 16 wherein said first resilient material is rubber having a Shore A durometer hardness of about 80 and said second resilient material is rubber having a Shore A durometer hardness of about 60.

19. The pipe joint of claim 18 wherein the angle defined by said V-shaped segment is between about 30° and about 60°.

20. The pipe joint of claim 18 wherein at least one nipple protrudes from said seventh linear segment.

* * * * *